United States Patent
Miyajima et al.

(10) Patent No.: US 9,375,868 B2
(45) Date of Patent: Jun. 28, 2016

(54) CONNECTOR MEMBER

(71) Applicant: TIGERS POLYMER CORPORATION, Osaka (JP)

(72) Inventors: Nobukatsu Miyajima, Hyogo (JP); Kiyofumi Hiroi, Hyogo (JP)

(73) Assignee: TIGERS POLYMER CORPORATION, Osaka (JP)

( * ) Notice: Subject to any disclaimer, the term of this patent is extended or adjusted under 35 U.S.C. 154(b) by 0 days.

(21) Appl. No.: 14/676,360

(22) Filed: Apr. 1, 2015

(65) Prior Publication Data

US 2015/0202810 A1    Jul. 23, 2015

Related U.S. Application Data

(62) Division of application No. 13/965,546, filed on Aug. 13, 2013, now abandoned.

(30) Foreign Application Priority Data

Feb. 6, 2013   (JP) .................. 2013-021040

(51) Int. Cl.
| | |
|---|---|
| B29C 45/26 | (2006.01) |
| B29C 45/27 | (2006.01) |
| F16L 21/035 | (2006.01) |
| F16L 39/00 | (2006.01) |
| B29L 23/00 | (2006.01) |

(52) U.S. Cl.
CPC ........... B29C 45/2708 (2013.01); B29C 45/261 (2013.01); F16L 21/035 (2013.01); F16L 39/00 (2013.01); B29K 2905/00 (2013.01); B29L 2023/22 (2013.01)

(58) Field of Classification Search
CPC .............. B29C 45/261; B29C 45/2612; B29C 45/2708; B29C 2045/2714; B29C 2045/2716
See application file for complete search history.

(56) References Cited

U.S. PATENT DOCUMENTS

| | | | |
|---|---|---|---|
| 507,842 A | | 10/1893 | Prutzman |
| 3,508,299 A | * | 4/1970 | Ahern .................. B29C 45/38 425/309 |
| 4,507,842 A | | 4/1985 | Werner |
| 5,728,484 A | * | 3/1998 | Yamaguchi ......... B29C 45/0025 264/328.9 |
| 2011/0204622 A1 | | 8/2011 | Lewis et al. |
| 2013/0240528 A1 | * | 9/2013 | De Beer ............. B29D 99/0096 220/288 |

FOREIGN PATENT DOCUMENTS

| | | |
|---|---|---|
| CN | 101293391 A | 10/2008 |
| CN | 102753878 A | 10/2012 |
| JP | 11-201383 | 7/1999 |
| JP | 2005-207463 | 8/2005 |
| JP | 2011-17378 | 1/2011 |
| WO | 2011079226 | 6/2011 |

OTHER PUBLICATIONS

Chinese Office Action issued on Jun. 24, 2015 for the corresponding Chinese Patent Application No. 201310349538.9.

* cited by examiner

*Primary Examiner* — Jill Heitbrink
(74) *Attorney, Agent, or Firm* — Rankin, Hill & Clark LLP

(57) ABSTRACT

A connector member according to this disclosure includes: a hollow pipe-shaped portion molded by injection molding of a synthetic resin; two ring-shaped seal grooves disposed at an outer peripheral surface of the pipe-shaped portion; and a ring-shaped gate mark formed at a region close to a pipe end with respect to the seal groove, the ring-shaped gate mark being formed at an inner peripheral surface side of the pipe-shaped portion.

4 Claims, 4 Drawing Sheets

CONNECTOR MEMBER

CROSS-REFERENCE TO RELATED APPLICATION

This application claims priority from Japanese Patent Application No. 2013-21040 filed with the Japan Patent Office on Feb. 6, 2013, the entire content of which is hereby incorporated by reference.

BACKGROUND

1. Technical Field

This disclosure relates to a connector member used for a coupling structure of a pipe line.

2. Related Art

Pipe line blocks that include pipe lines are used in a hydraulic pressure circuit, a fluid supply circuit, or the like. The pipe line blocks face one another and the pipe lines included in the respective pipe line blocks are coupled to one another so as to form a continuous pipe line. For example, the coupling structures of the pipe line and the pipe line blocks are employed in a hydraulic pressure circuit for an automatic transmission of an automobile or a coolant circulation circuit for an air conditioner.

In coupling the pipe lines between the pipe line blocks, to ensure seal performance while facilitating the coupling operation, a pipe-shaped connector member is interposed between the pipe line blocks in many cases. The connector member is, for example, formed by injection molding of a synthetic resin.

For example, JP-A-2005-207463 discloses the following technique. Lines (an outlet and a coupling hole) of a liquid tank and a double-pipe joint block to be coupled together are coupled with each other. A pipe joint (a connector member) is clamped between joining surfaces of the liquid tank and the double-pipe joint block. The connector member includes a flange portion at an outer periphery of an intermediate portion in a longitudinal direction. Coupling pipe portions at both ends of the connector member are inserted into open ends of respective lines with O-rings. The flange portion of the connector member is housed in an annular-shaped housing depressed portion disposed at the block. In this state, the connector member is clamped between joining surfaces of the liquid tank and the double-pipe joint block. The patent publication discloses that cost reduction can be achieved with a simple configuration using the connector member and the coupling structure.

SUMMARY

A connector member (the present connector member) according to this disclosure includes: a hollow pipe-shaped portion molded by injection molding of a synthetic resin; two ring-shaped seal grooves disposed at an outer peripheral surface of the pipe-shaped portion; and a ring-shaped gate mark formed at a region close to a pipe end with respect to the seal groove, the ring-shaped gate mark being formed at an inner peripheral surface side of the pipe-shaped portion.

DETAILED DESCRIPTION

Figure 1:
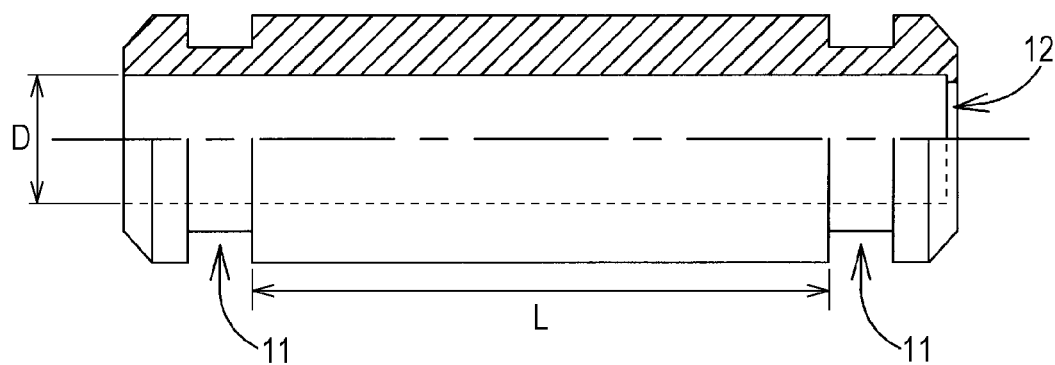
FIG. 1 is a partial cross-sectional view illustrating a connector member according to a first embodiment of this disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The inventors have examined molding such a connector member by injection molding of a synthetic resin. Under the examination, the inventors have found that manufacturing the connector member by injection molding of a conventional resin makes sufficiently enhancing the pressure resistance of the connector member difficult. If the pressure resistance of the connector member is insufficient, the connector member is damaged under internal pressure. This may result in losing functionality of the hydraulic pressure circuit.

An object of this disclosure is to provide a connector member made of synthetic resin excellent in pressure resistance strength.

In this disclosure, a pipe-shaped portion of the connector member is manufactured by injection molding of the synthetic resin. A gate for injection molding of the synthetic resin is a ring-shaped gate (such as a disk gate). The gate is disposed at a pipe end side with respect to a seal groove of the connector member.

A connector member (the present connector member) according to an embodiment of this disclosure includes: a hollow pipe-shaped portion molded by injection molding of a synthetic resin; two ring-shaped seal grooves disposed at an outer peripheral surface of the pipe-shaped portion; and a ring-shaped gate mark formed at a region close to a pipe end with respect to the seal groove, the ring-shaped gate mark being formed at an inner peripheral surface side of the pipe-shaped portion.

It is preferable that, when a distance between the two seal grooves is denoted by L and an inner diameter of the pipe-shaped portion is denoted by D, $L/D > 3$ be satisfied. It is also preferable that the gate mark be formed at a pipe end of the pipe-shaped portion. The gate mark may be formed at an inner peripheral surface of the pipe-shaped portion.

In the present connector member, the pipe-shaped portion may include a tapered distal end portion in a pipe axial direction.

In the present connector member, the pipe-shaped portion may be formed by injection molding from an inner peripheral surface side of the pipe-shaped portion using a disk gate.

The present connector member may further include: a plurality of the pipe-shaped portions disposed approximately parallel; and a plate-shaped coupling portion that couples between the plurality of pipe-shaped portions. The plurality of pipe-shaped portions and the coupling portion may be integrally molded by injection molding of the synthetic resin.

In this case, the coupling portion may include a weld generated during injection molding of the synthetic resin.

With this connector member, a pressure resistance strength of the connector member made of a synthetic resin can be enhanced. When the relationship between the distance L between the two seal grooves and the inner diameter D of the pipe-shaped portion satisfies L/D>3, the pressure resistance strength can be increased even if a connector member has a thin and long pipe-shaped portion.

Furthermore, forming the gate mark at the pipe end of the pipe-shaped portion simplifies the structure of a metallic mold used for injection molding. This is advantageous in terms of production efficiency and a production cost.

Embodiments of this disclosure are now described with an exemplary connector member used for a hydraulic pressure circuit for an automatic transmission of an automobile with reference to the accompanying drawings. This disclosure is not limited to the embodiments described below. This disclosure can be embodied as another embodiment.

(First Embodiment)

In FIG. 1, a connector member 1 according to a first embodiment of this disclosure is illustrated. The cross-sectional view of the connector member 1 is illustrated at the upper half portion of FIG. 1 while the external view of the connector member 1 is illustrated at the lower half portion of FIG. 1. The connector member 1 is a member made of synthetic resin. The connector member 1 is formed in a straight pipe shape with a cylindrical cross section. That is, in this embodiment, the connector member 1 is mainly configured by a hollow pipe-shaped portion 10.

The pipe-shaped portion 10 of the connector member 1 includes respective seal grooves 11 near both end portions in a longitudinal direction. The connector member 1 according to this embodiment includes the two seal grooves 11. The seal groove 11 is a ring-shaped groove with a groove cross section of an approximately rectangular shape. An O-ring, which will be described below, is mounted to the seal groove 11 to seal between the connector member 1 and an inner peripheral surface of a pipe line 31 or 41. The connector member 1 according to this embodiment includes a pipe-shaped portion 10 with a tapered distal end portion in a longitudinal direction (the pipe axial direction). This allows the connector member 1 to be easily inserted into the pipe line.

In the connector member 1 according to this embodiment, L/D=6 is satisfied when L denotes a distance between the two seal grooves 11 and D denotes an inner diameter of the pipe-shaped portion 10. L/D is preferably more than 3 and more preferably equal to or more than 4. A greater L/D has an advantage in terms of a pressure resistance.

The connector member 1, as will be described below, is formed by injection molding of a synthetic resin. The connector member 1 includes a gate mark 12 that corresponds to a gate from which a resin is injected during injection molding. The gate mark 12 is formed in a ring shape at an inner peripheral surface side (one of an inner peripheral surface and an end surface) of the pipe-shaped portion 10 of the connector member 1. That is, during molding of the pipe-shaped portion 10, a resin is injected into an injection mold cavity through a disk gate coupled to the inner peripheral surface side of the pipe-shaped portion 10. The gate mark 12 is formed at the end portion (that is, a position close to a pipe end) of the pipe-shaped portion 10 of the connector member 1 in the longitudinal direction (the pipe axial direction). Especially, the gate mark 12 is formed in a region close to the pipe end in the pipe axial direction with respect to the seal groove 11.

Especially, in the connector member 1 according to this embodiment, the gate mark 12 is formed at the pipe end of the pipe-shaped portion 10 in the pipe axial direction. By configuring an injection mold for injection molding such that the gate mark 12 is formed at the pipe end of the pipe-shaped portion, the structure of the injection mold is simplified. This is preferred since production efficiency is enhanced.

In the connector member 1 according to this embodiment, the gate mark 12 is formed at the inner peripheral surface of the pipe-shaped portion 10. That is, the disk gate can be easily cut by performing injection molding with the disk gate being coupled to the inner peripheral surface of the pipe-shaped portion 10. Forming the gate mark 12 at the inner peripheral surface of the pipe-shaped portion 10 does not cause the gate mark 12 where the disk gate has been cut to protrude to the distal surface of the pipe-shaped portion 10. Accordingly, the pipe-shaped portion 10 is molded to have a more precise dimension in the longitudinal direction. As long as the gate mark 12 is disposed at the inner peripheral surface side of the pipe-shaped portion 10, the gate mark 12 may be formed on the end surface of the pipe-shaped portion 10 (the pipe end surface).

A synthetic resin constituting the connector member 1 is not especially limited insofar as the synthetic resin is a resin that can be molded by injection molding. As the synthetic resin, preferably, for example, a thermoplastic resin such as an olefin-based resin (such as a polypropylene resin), a polyamide resin, an acrylonitrile butadiene styrene resin, a thermosetting resin such as a melamine resin, a rubber, and a thermoplastic elastomer can be used. The connector member 1 according to this embodiment is formed by a polyamide resin.

Figure 2A:
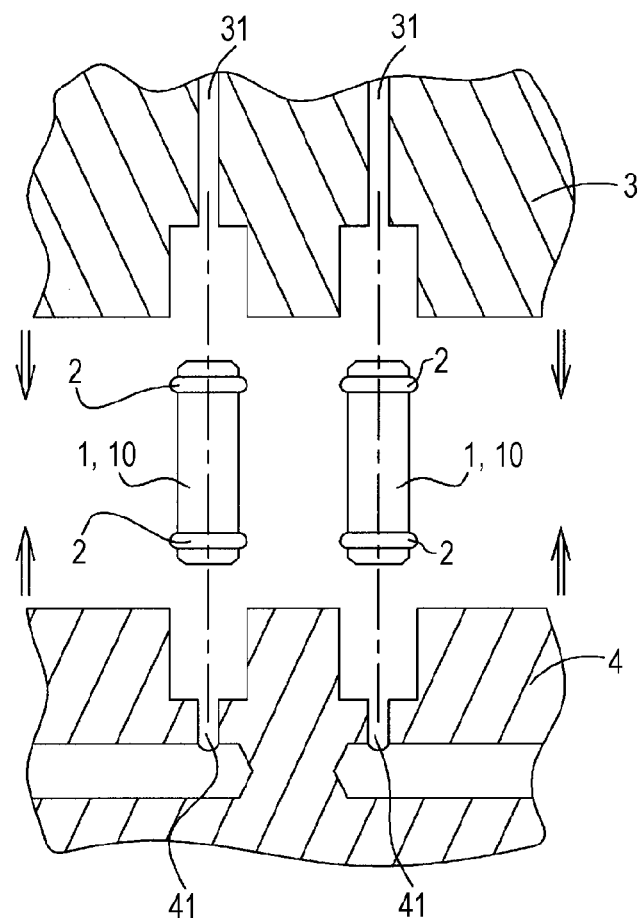
FIGS. 2A and 2B are cross-sectional views illustrating a pipe line of a pipe line block coupled by the connector member according to the first embodiment.
Figure 2B:
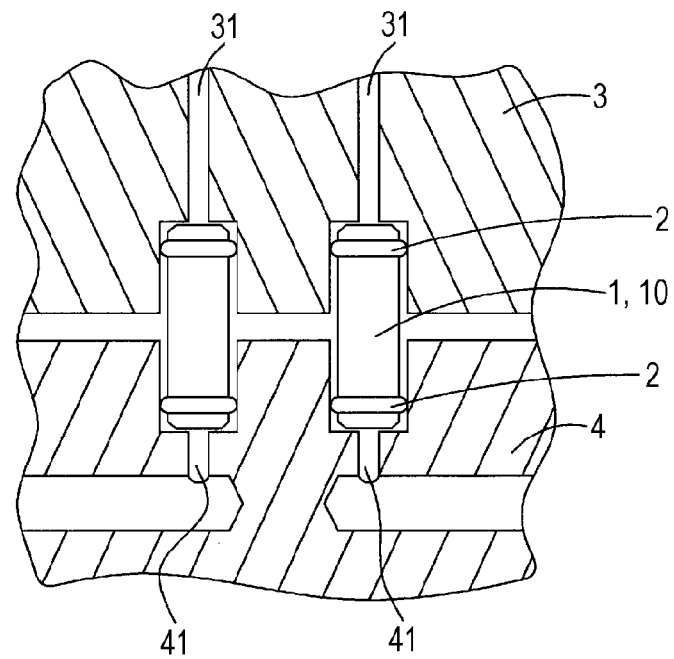

A state where the pipe line of the hydraulic pressure circuit is coupled with the connector member 1 will be described with reference to FIGS. 2A and 2B. In FIGS. 2A and 2B, the partial pipe line blocks 3 and 4 are illustrated by a cross section while the connector member 1 is illustrated by an external view. Respective pipe lines 31 and 41 are formed in the interior of the pipe line blocks 3 and 4. The plurality of pipe line blocks 3 and 4 is disposed so as to face each other with a predetermined positional relationship. The interior pipe lines of the plurality of pipe line blocks 3 and 4 communicate with one another to make a continuous pipe line. The pipe line blocks 3 and 4 are typically constituted, for example, by an iron-based alloy, an aluminum alloy, or a synthetic resin. The pipe line blocks 3 and 4 preferably include a plurality of pipe lines 31 and 41. The pipe lines 31 and 41 are formed by, for example, machining typically.

The connector member 1 is interposed between the pipe line blocks 3 and 4, which mutually face, to couple the pipe line 31 and the pipe line 41. This embodiment includes the pipe line block 3 at a pressure control valve side and the pipe line block 4 at a plumbing side. The pipe line blocks 3 and 4 respectively include pipe lines 31 and 41 inside by boring. As illustrated in FIG. 2A, the connector member 1 is disposed so as to enter the pipe lines 31 and 41. The pipe line blocks 3 and 4 are disposed opposingly. Then, the pipe line 31 and the pipe line 41 at mutually facing position are coupled through the connector member 1.

With the connector member 1, sealing materials (O-rings) 2 are attached to the two seal grooves 11. Both ends portions of the pipe-shaped portion 10 of the connector member 1 are inserted into the respective pipe line 31 and the pipe line 41. This couples the pipe line 31 and the pipe line 41 (FIG. 2B). That is, the two sealing materials (the O-rings) 2 seal between outer peripheral surfaces of the pipe-shaped portion 10 of the connector member 1 and inner peripheral surfaces of the pipe lines 31 and 41.

Insofar as a sealing portion can be sufficiently sealed, the sealing material 2 is not limited to the O-ring, but may be another sealing material and another sealing structure. For example, by postforming an elastomeric material to the seal groove 11, the sealing material 2 may be integrally molded to the seal groove 11.

According to this embodiment, the pipe lines 31 and 41 disposed at the respective pipe line blocks 3 and 4 form a step shape near the end surfaces of the pipe line blocks 3 and 4. This step shape is to prevent or reduce the inserted connector member 1 from entering one pipe line excessively. If over insertion of the connector member 1 can be reduced, the shape of the pipe lines 31 and 41 may be a straight pipe without a step shape. In FIG. 2B, the assembled pipe line blocks 3 and 4 are illustrated. In the example illustrated in the drawing, a small clearance is ensured between the pipe line blocks 3 and 4. However, the pipe line blocks 3 and 4 may be assembled such that the facing surfaces are brought into close contact with one another.

Figure 3:
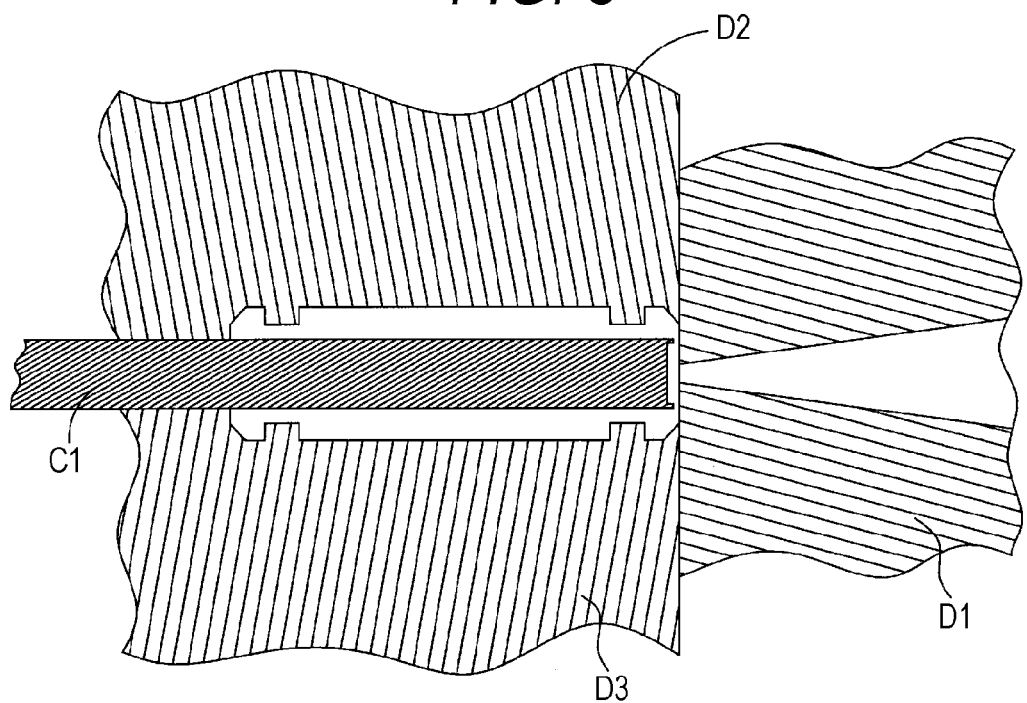
FIG. 3 is a cross-sectional view of an injection mold of the connector member according to the first embodiment.
Figure 4:
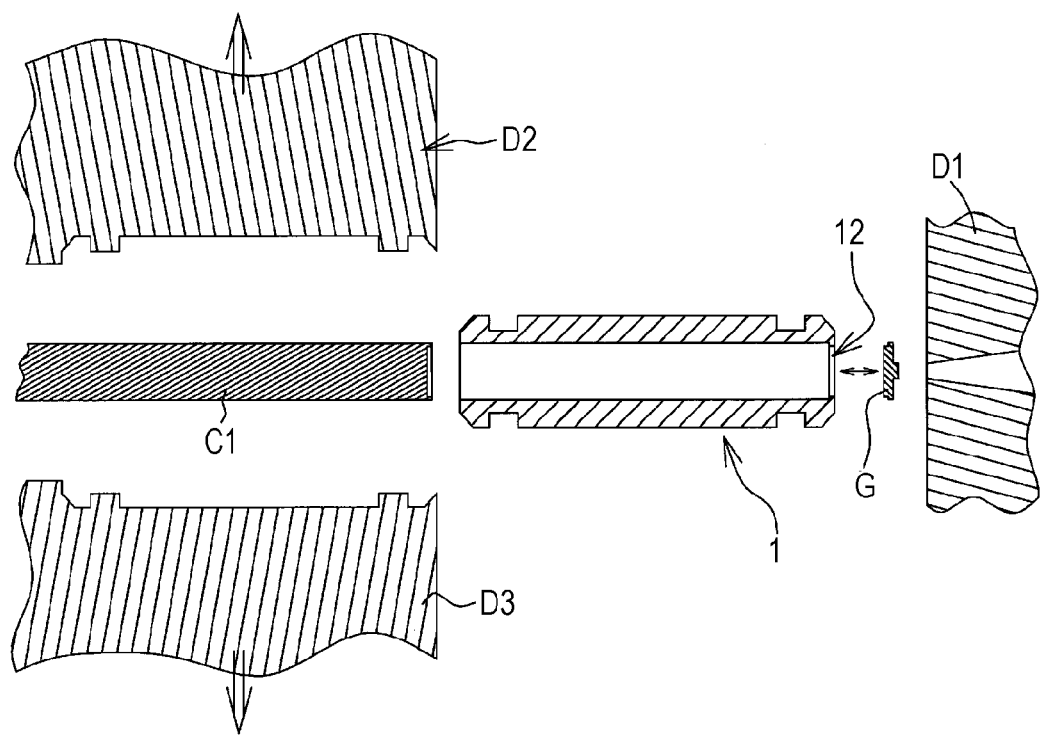
FIG. 4 is a cross-sectional view illustrating a state where the injection mold of the connector member according to the first embodiment is opened.

A method for manufacturing the connector member 1 will be described. The connector member 1 is manufactured by injection molding of a resin. FIG. 3 illustrates a metallic mold used for the injection molding of the connector member 1. FIG. 3 is a schematic cross-sectional view of a closed metallic mold. The metallic mold includes one set of cavity molds D1, D2, and D3 that define the cavity. The cavity has an inner surface shape matching the outer surface shape of the connector member 1. The cavity molds D1, D2, and D3 internally include a column-shaped core mold C1. The core mold C1 has a shape almost the same as the inner surface shape of the connector member 1. FIG. 3 and FIG. 4 illustrate the cavity molds D1, D2, and D3 and the core mold C1 in cross-sectional views. In this embodiment, the cavity mold D1 and the cavity molds D2 and D3 are divided at a surface that becomes one end surface of the connector member 1. The cavity molds D2 and D3 are divided at a surface including a central axis of the connector member 1. The cavity molds D1, D2, and D3 and the core mold C1 include an opening and closing mechanism or a slide mechanism as necessary to allow an injection molding and a removal of a molded product. The detailed illustration and descriptions are omitted.

A fluid resin is injected from a sprue disposed at the cavity mold D1 on the right side in FIG. 3. The end surface of the core mold C1 and the cavity mold D1 are disposed to define a small clearance between them with the metallic mold being closed. This defines the disk shaped space continuous with the sprue. The outer periphery of the disk-shaped space is coupled to an inner peripheral of a cavity, which is a space where the connector member 1 is to be formed. That is, a resin injected from the sprue passes through a disk gate defined by the end surface of the core mold C1 and the cavity mold D1 and is supplied to the cavity where the connector member 1 is to be formed.

The fluid resin is supplied from the disk gate to the cavity, where the connector member 1 is to be formed, cylindrically and continuously. This consequently suppresses generation of weld at the pipe-shaped portion 10 of the connector member 1 to be molded.

The resin is filled in the cavity and is hardened. After that, the mold is opened as illustrated in FIG. 4 to remove the molded product (the connector member 1). Then, a disk gate part G is removed from the connector member 1. Accordingly, the connector member 1 forms the gate mark 12 having a ring shape where the disk gate part G was coupled. Thus, the connector member 1 according to this embodiment is obtained.

A time point concerning the mold opening/the removal of the molded product and separation of the disk gate part G can be set at various time points. For example, by utilizing the slide mechanism of the metallic mold, the time points of the injection molding and sliding of the metallic mold may be adjusted. For example, before the mold opening, the disk gate part G may be separated inside of the metallic mold, then the metallic mold may be opened, and subsequently the molded product may be removed. Alternatively, by utilizing the slide mechanism of the metallic mold, the time points of the opening of the metallic mold and the sliding of the metallic mold may be adjusted. For example, when the mold is opened to remove the molded product, the disk gate part G may be separated. Alternatively, after the injection molding, the molded product may be removed with a disk gate part G still integrated with the portion of the resin to be the connector member 1. The disk gate part G may be separated from the connector member 1 in a post process.

According to this embodiment, for example, the cavity mold D1 is opened with the cavity molds D2 and D3 still closed after the injection molding. In this state, the core mold C1 is slid along the pipe axial direction while being pushed toward the cavity mold D1. This cuts off the disk gate part G. Then, the cavity molds D2 and D3 are opened, and the connector member 1 is removed from the core mold C1. Thus, the molded product is removed.

An action and effect that the above-described connector member 1 achieves will be described. The pipe-shaped portion 10 of the connector member 1 is formed by injection molding using a disk gate. This substantially avoids (reduces) a weld at the pipe-shaped portion 10. This contributes to improvement in the pressure resistance strength of the connector member 1.

The gate mark 12 is formed at an inner peripheral surface side of the pipe-shaped portion 10 of the connector member 1. The gate mark 12 is formed at a region close to the pipe end in the pipe axial direction of the pipe-shaped portion 10 with respect to the seal groove 11. This also contributes to improvement in the pressure resistance strength of the connector member. A mechanism that the position of the gate mark 12 contributes to the pressure resistance strength will be described.

The gate mark 12 is formed by mechanically breaking the resin, which is molded continuously toward the molded product body from the disk gate. Accordingly, a stretched and torn resin and/or a cut resin remain(s) at the gate mark 12. Therefore, the gate mark 12 includes a defect that could possibly be the origin of damage, rupture, and break. If pressure and/or conditions regarding strength become(s) severe, for example, a break originating from the gate mark 12 may occur. That is, the strength of the connector member 1 may be impaired.

However, with the connector member 1 according to this embodiment, the gate mark 12 is formed at the region close to the pipe end with respect to the seal groove 11 of the pipe-shaped portion 10. Even if pressure is applied to the hydraulic pressure circuit, high stress is less likely to occur at the region. In an interval region between the two seal grooves 11 of the pipe-shaped portion 10, a large pressure difference occurs between the inside and the outside of the pipe. Therefore, high pressure in accordance with the pressure difference occurs at the interval region. However, in the region close to the pipe end with respect to the seal groove 11, pressure difference does not substantially occur between the inside and the outside of the pipe. Therefore, stress applied to this region is less likely to increase. Thus, forming the gate mark 12 at the region close to the pipe end with respect to the seal groove 11 can maintain stress applied to the gate mark 12 low. This improves the pressure resistance strength of the connector member 1.

At the formation part of the seal groove 11 in the pipe-shaped portion 10, the pipe wall of the pipe-shaped portion 10 is thin compared with other parts. This possibly causes stretching or deformation of the pipe wall of formation part of the seal groove 11 (the pipe wall of the seal groove 11) during separation of the disk gate from the connector member 1. This deformation can also possibly be one cause of impair of the pressure resistance strength of the connector member 1. With the connector member 1 according to this embodiment, the gate mark 12 is formed at the region close to the pipe end with respect to the seal groove 11 of the pipe-shaped portion 10. This allows a force applied to the pipe wall of the seal groove 11 when the disk gate is separated to be less. This prevents (reduces) deformation of the pipe wall of the seal groove 11. Consequently, the pressure resistance strength of the connector member 1 is enhanced.

In the case where a disk gate is disposed at an inner peripheral surface of the pipe-shaped portion 10, a step difference that sandwiches the gate mark 12 of the disk gate occurs at the inner peripheral surface of the pipe-shaped portion 10 in many cases. The step difference can also possibly be one cause of impair of the pressure resistance strength of the connector member 1 due to concentration of stress generated against internal pressure. With the connector member 1, the gate mark 12 is formed at the region close to the pipe end with respect to the seal groove 11 of the pipe-shaped portion 10. Accordingly, stress caused by the internal pressure is less likely to occur at the formation part of the gate mark 12. Therefore, stress concentration also is less likely to occur in the part. This allows stress applied to the formation part of the gate mark 12 to be maintained low. Consequently, the pressure resistance strength of the connector member 1 is enhanced.

With the connector member 1 according to this embodiment, it is preferred that the relationship between a distance L, which is a distance between the two seal grooves 11, and an inner diameter D, which is an inner diameter of the pipe-shaped portion 10, satisfy L/D>3. This effectively improves the pressure resistance strength of a thin and long pipe-shaped portion 10 (the connector member 1). Injection molding using a disk gate allows forming the thin and long pipe-shaped portion 10 (the connector member 1) with L/D exceeding 3. In this case, in terms of mold releasability of a core mold, the metallic mold is configured to dispose the disk gate at the center of the pipe-shaped portion 10 in the longitudinal direction generally. In contrast to this, in this disclosure, the metallic mold is configured to dispose the disk gate close to the pipe end of the pipe-shaped portion 10 with respect to the seal groove 11. Use of such metallic mold allows enhancing the pressure resistance strength of the connector member 1 with the thin and long pipe-shaped portion 10.

This disclosure is not limited to the above embodiments. This disclosure includes various modified embodiments. Other embodiments of this disclosure are described below by mainly referring to the differences from the above embodiments. Detailed descriptions of components similar to those described in the above embodiments are omitted. The plurality of embodiments in this disclosure may be implemented by combining one part thereof with other or replacing one part thereof with other.

(Second Embodiment)

Figure 5:
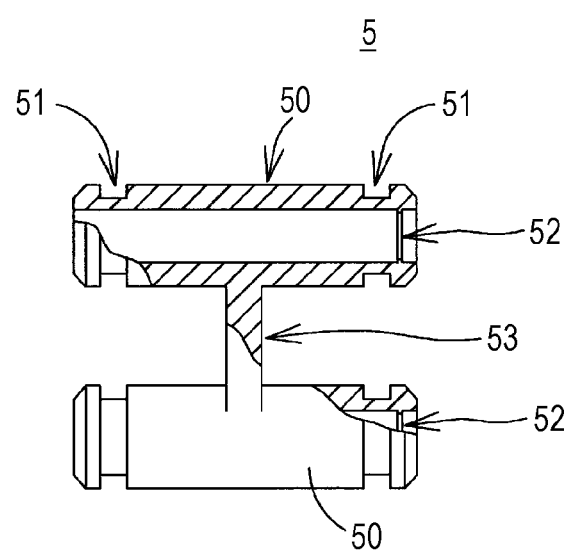
FIG. 5 is a partial cross-sectional view illustrating a connector member according to a second embodiment of this disclosure.

FIG. 5 illustrates a connector member 5 according to a second embodiment of this disclosure. The connector member 5 according to this embodiment includes two pipe-shaped portions 50 and a plate-shaped coupling portion 53. The two pipe-shaped portions 50 are disposed approximately parallel. The plate-shaped coupling portion 53 couples between the two pipe-shaped portions 50. The two pipe-shaped portions 50 are integrally molded with the coupling portion 53. Thus, the connector member according to this disclosure may include a plurality of pipe-shaped portions. For example, disposing two, three, or four pipe-shaped portions at the connector member allows coupling two, three, or four pipe lines at a time. This enhances efficiency of the coupling operation.

According to this embodiment, the plate-shaped coupling portion 53 is coupled to a part near the center of the pipe-shaped portion 50 of the connector member 5 in the longitudinal direction. This coupling portion 53, like the connector member disclosed in JP-A-2005-207463, functions for positioning between the connector member 5 and the pipe line in the longitudinal direction.

With the connector member 5 according to this embodiment, the two pipe-shaped portions 50 include each one of gate marks 52 of the disk gates. The position of the gate mark 52 in the pipe axial direction is a position slightly away from the end surface of the pipe-shaped portion 50 in the region close to the end surface (the pipe end) of the pipe-shaped portion 50 with respect to a seal groove 51. The gate mark 52 is formed at the inner peripheral surface of the pipe-shaped portion 50. Thus, the gate mark 52 may be formed at a position slightly away from the end surface of the pipe-shaped portion 50. Even such connector member 5 features high pressure resistance strength.

According to this embodiment, the two pipe-shaped portions 50 include the gate mark 52 of the disk gate at one side of the end portions (for example, the end portion on the right side in FIG. 5). The gate marks 52 of the respective pipe-shaped portions 50 may be formed at mutually opposite end portions (for example, the end portion on the right side and the end portion on the left side in FIG. 5). However, it is preferable to form the gate marks 52 at one side of the end portions in the two pipe-shaped portions 50 as illustrated in FIG. 5. This allows a resin, which flows from the formation part (cavity) of the two pipe-shaped portions 50 to the formation part (cavity) of the coupling portion 53, to flow approximately at the same time point during manufacture of the connector member 5. This allows forming a weld at the formation part (cavity) of the coupling portion 53. Consequently, generation of weld at the pipe-shaped portion 50 is suppressed. This is preferred especially in terms of improving the pressure resistance strength.

The connector member may have another part in addition to a hollow pipe-shaped portion. Another exemplary part includes a flange portion to prevent or reduce over insertion of the connector member to the pipe line, a coupling portion according to the second embodiment, and a key portion to prevent incorrect assembly of the connector member.

A specific applicable field of the connector member according to this disclosure is not especially limited. The connector member according to this disclosure is applicable to a variety of fields insofar as the connector member made of a synthetic resin is applicable. For example, the connector member according to this disclosure, for example, can be used for a pipe line block such as a hydraulic pressure circuit, a refrigerant tubing, a cooling water circulation system, a pressure transmission system, and a flow regulating valve. Further, various pipe lines of the pressure transmission circuit not only a pipe line of a circuit for transmitting a fluid pressure such as an oil pressure and a hydraulic pressure but also a pipe line of a circuit for transmitting gas pressure such as air pressure or similar pipe line can be coupled by the connector member according to this disclosure.

The connector member according to this disclosure, for example, can be used for coupling a pipe line disposed at a pipe line block. Thus, the connector member according to this disclosure provides a high industrial utility value. The connector member according to the embodiments may be the following first to third connector members. The first connector member is molded to a shape with a hollow pipe-shaped portion by injection molding of a synthetic resin. The connector member is used for a pressure transmission circuit. The connector member includes two ring-shaped seal grooves at an outer peripheral surface of the pipe-shaped portion. An injection molding of a resin is performed from an inner peripheral surface side of the pipe-shaped portion through a disk gate. A gate mark is present at a region near a pipe end with respect to the seal groove in a pipe axial direction of the pipe-shaped portion. The second connector member according to the first connector member is configured as follows. When a distance between the two seal grooves is denoted by L and an inner diameter of the pipe-shaped portion is denoted by D, $L/D>3$ is satisfied. The third connector member according to the first or the second connector member is configured as follows. The gate mark is present at a pipe end of the pipe-shaped portion. The first to the third connector members are molded by injection molding of a synthetic resin. The injection molding of the resin is performed from an inner peripheral surface side of the pipe-shaped portion through a disk gate. Since the gate mark is present at a region close to the pipe end with respect to the seal groove in the pipe axial direction of the pipe-shaped portion of the first to third connector members, it is possible to maintain low stress applied to the gate mark, thus improving the pressure resistance strength of the first to third connector members.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for making a connector member by injection molding of a synthetic resin, the connector member comprising a hollow pipe-shaped portion and two ring-shaped seal grooves disposed at an outer peripheral surface of the pipe-shaped portion, the method comprising:

preparing a metallic mold comprising a cavity mold having an inner surface shape that forms an outer surface shape of the connector member and a core mold having an outer shape that forms an inner surface shape of the connector member, the metallic mold defining a cavity where the connector member is to be formed and having a gate for supplying the synthetic resin to the cavity;

closing the metallic mold to form the cavity so that the gate is formed;

injecting the synthetic resin from the gate to the cavity to form the connector member;

opening the metallic mold to remove the formed connector member; and removing the synthetic resin formed in the gate from the connector member, wherein the gate is a ring-shaped gate defined by the cavity mold and an end surface of the core mold, the gate is connected to the cavity at an inner peripheral surface of the pipe-shaped portion and at a region close to a pipe end of the pipe-shaped portion with respect to the seal groove, the synthetic resin is cylindrically supplied from the gate to the cavity in the injecting step, the connector member further comprises a plurality of the pipe-shaped portions disposed approximately parallel and a plate-shaped coupling portion that couples the plurality of pipe-shaped portions to each other, the metallic mold further comprises a plurality of the ring-shaped gates, the plurality of pipe-shaped portions and the coupling portion are integrally molded, and each of the plurality of ring-shaped gates is connected to the cavity where each of the plurality of pipe-shaped portions is to be formed.

2. The method according to claim 1, wherein the ring-shaped gate is a disk-shaped gate defined by the cavity mold and the end surface of the core mold.

3. The method according to claim 1, wherein the gate is connected to the cavity at the pipe end of the pipe-shaped portion.

4. The method according to claim 1, wherein, in the injecting step, the synthetic resin is flowed from a portion of the cavity where one of the plurality of pipe-shaped portions is to be formed and from a portion of the cavity where another one of the plurality of pipe-shaped portions is to be formed to a portion of the cavity where the plate-shaped coupling portion is to be formed at the same time points.

* * * * *